Oct. 4, 1960 C. E. JONES, JR 2,955,159

NARROW-BAND VIDEO COMMUNICATION SYSTEM

Filed Oct. 1, 1958

Inventor
CLAUDE E. JONES, JR.
By Philip M. Bolton
Attorney

United States Patent Office 2,955,159
Patented Oct. 4, 1960

2,955,159

NARROW-BAND VIDEO COMMUNICATION SYSTEM

Claude E. Jones, Jr., Atlanta, Ga., assignor to International Telephone and Telegraph Corporation, Nutley, N.J., a corporation of Maryland Filed Oct. 1, 1958, Ser. No. 764,697

10 Claims. (Cl. 178—7.2)

Figures 1, 2, 3:
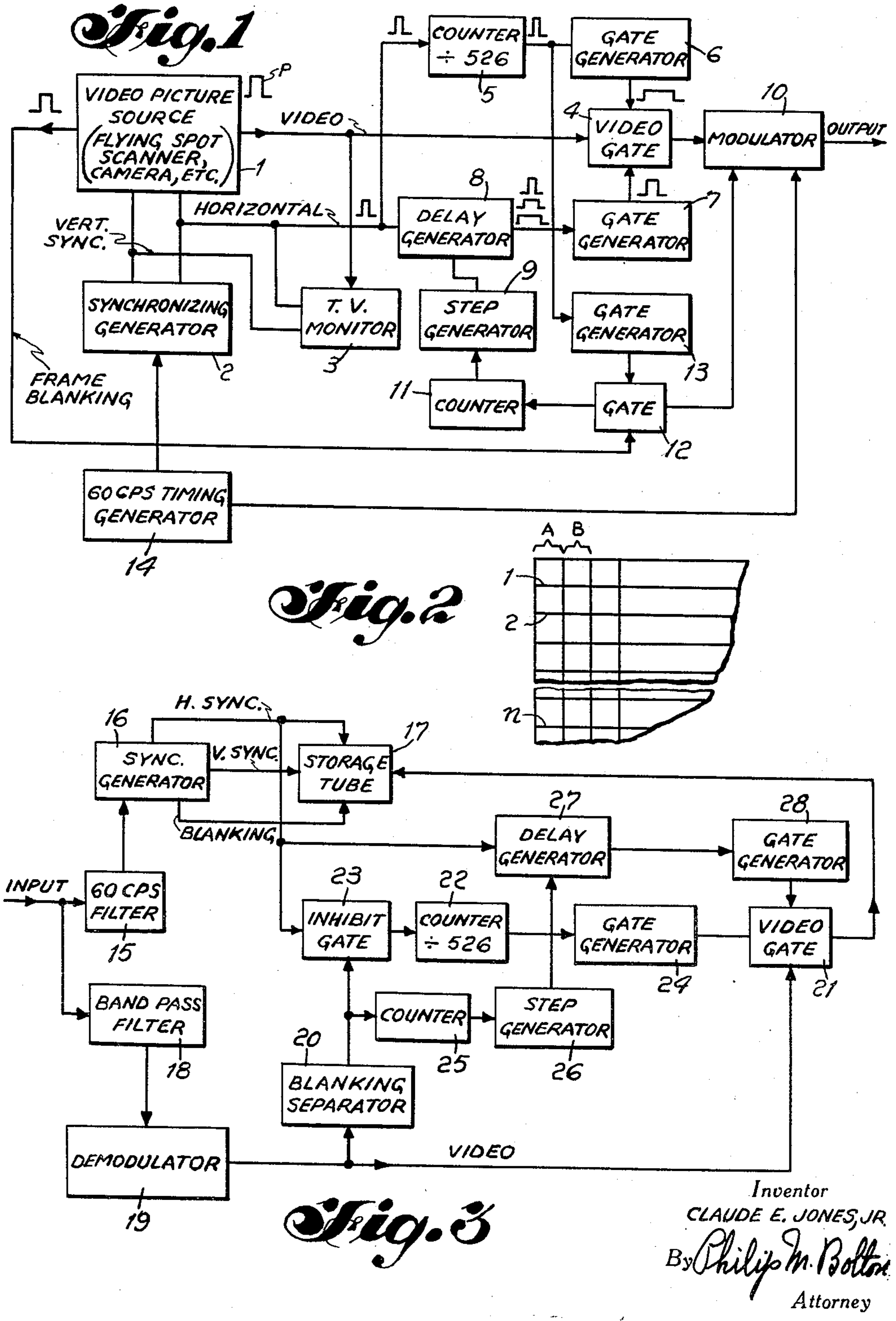

This invention relates to a video transmitting and receiving system, and more particularly to a system which is capable of transmitting video information over a channel occupying only a small fraction of the standard television band width.

There are many situations where it is desirable to transmit video information using television techniques. However, because of the relatively wide band width required for standard television transmission, such techniques are not utilized. One example is facsimile transmission. Facsimile ordinarily is transmitted over existing telephone communication cable, and as a result of band width allocation, facsimile transmission is limited only to a fraction of the band width required for television transmission.

Many attempts have been made to compress the standard television band width for facsimile transmission and thereby benefit from the technical advances achieved in the television field. To date, none of these attempts have been successful because when the television band width is compressed into conventional facsimile channel allocation, the picture resolution becomes so degraded that it has been found preferable to revert back to the conventional facsimile transmission techniques.

Another problem which arises when it is desired to use television techniques for facsimile transmission is that the conventional receiving equipment is incapable of processing the information when it is transmitted at standard television scanning speed of 15,750 lines of information per second.

Accordingly, it is a primary object of this invention to provide a video communication system which is capable of transmitting video information over a fraction of the standard television band width and at a speed slower than the standard scanning rate.

It is a further object of this invention to provide a novel and unique facsimile transmission system, using television techniques.

It is a further object of this invention to provide a video transmission system which is capable of transmitting pictorial information on a bit-by-bit basis, and at a relatively slow speed, and receiving and synthesizing this information in a storage device.

Although the invention has particular utility in the facsimile field, its application to other related fields will be obvious to those skilled in the art. The invention, therefore, will be described broadly as a video communication system.

In accordance with one aspect of the invention, there is provided a transmission system comprising means for scanning an information record and for producing a succession of waves each corresponding to a line of scanned information. The invention is characterized by selecting corresponding minor fractions of the same time base from a plurality of waves corresponding to successive lines, and transmitting the selected minor fractions at a slower rate of speed than the speed at which the record is scanned.

Since the plurality of minor fractions has the same time base, the minor fractions define a vertical strip on the scanning raster. The information is transmitted bit-by-bit, vertically through the raster, at the rate of one line per plurality of lines, until all of the bits in a vertical strip are transmitted. The complete picture is transmitted by effectively stepping the vertical strip across the raster by selecting successive minor fractions of different time bases.

In accordance with a more limited aspect of the invention, the rate of transmission corresponds to approximately one line per frame, and since only a minor fraction of the line is selected for transmission, the band width is reduced in the same proportion that the minor fraction bears to a complete line.

The above-mentioned and other features and objects of this invention and the manner of attaining them will become more apparent and the invention itself will be best understood by reference to the following description of an embodiment of the invention taken in conjunction with the accompanying drawing, wherein:

Fig. 1 is a block diagram of the transmission system;
Fig. 2 is an enlarged view of a segment of a raster; and
Fig. 3 is a block diagram of the receiver.

Generally, the invention comprises a transmitter which includes a standard video picture source, and a video camera for scanning the picture source and producing video waves in correspondence with the tonal variations of the picture. In the conventional television transmitter, the scanned information is transmitted as rapidly as the scanning is effected. In other words, as a line of video information is scanned, the corresponding waveform is transmitted to the receiving station. At this scanning speed, a band width of approximately six megacycles is required for adequate resolution. In accordance with the invention, the band width is reduced to a small fraction of the standard television band width, with no sacrifice to resolution, by transmitting only small bits of video information corresponding to a minor fraction of a modulated line. The transmission is at a preferred rate of approximately one line per frame. Thus, if the raster were time-divided into 350 vertical strips, only the information on one line within the vertical strip would be transmitted during the period of one frame. This would result in a band width reduction of 1/350. If there were 485 active horizontal lines and if one bit per frame were transmitted, it would require 485 frames of scanning to transmit all the bits within one vertical strip. Upon transmission of one complete strip, the next adjacent strip is selected, and so on, until the picture is transmitted.

Referring now to Fig. 1, the transmitter comprises a video camera, such as a Vidicon, or a flying spot scanner, for scanning a video picture source, which may, for example, be a picture for facsimile transmission. The video camera is conventional and comprises the necessary components for scanning the picture and for producing video waves corresponding to the tonal variations of the picture. The video camera also produces the line and frame blanking signals.

Line and frame scanning speed is controlled by a generator 2 producing horizontal and vertical synchronizing pulses. The generator 2 is accurately timed by a crystal-controlled 60 cycle timing signal produced by generator 14.

The output from the scanner comprises successive waveforms corresponding to a succession of lines of scanned video information. Each line of video information is flanked by line blanking pulses, such as suggested by the pulse symbol "P" at the output side of the scanner 1.

The video information is preferably monitored by applying the video signals together with the horizontal and vertical synchronizing pulses from the generator 2 to a television monitor 3.

The video signals are also applied to a normally closed video gate 4 which is preferably a coincident or "and" type gate requiring coincident inputs for operation.

It will be recalled that in order to conserve band width, only small bits of line information are selected for transmission. The video gate 4 is, therefore, controlled by a line selection circuit and a bit selection circuit.

The line selection circuit comprises a frequency divider or counter 5 coupled to the horizontal synchronizing pulse output side of the generator 2. The counter 5 preferably employs bistable Eccles-Jordan circuits and is designed to produce an output pulse in response to a given count of input pulses. This type of counter is well known in the computer field. In accordance with the preferred embodiment, one line is selected per 526 lines, with the lines slipping down through the raster one line per frame. Thus, a first pulse is produced corresponding to a line of the first frame, a second pulse is produced corresponding to the next successive line of the second frame, and so forth. To achieve this sequence, the counter is designed to deliver a pulse in response to a count of 526. Of course, the particular count is determined by the resolution desired, speed of selection, etc., so that the count of 526 is by way of example and for the preferred embodiment.

Thus, in response to 526 horizontal line pulses, the frequency divider, or counter 5, delivers a pulse to a gate generator 6. The gate generator 6 is preferably a monostable multivibrator and generates a pulse of a preset width when triggered by the pulse from the counter 5. The desired pulse width is slightly longer in duration than the time base of a scanning line to take care of possible minor drifting in the horizontal scanning oscillator. This pulse is applied to one input of the video gate 4 and, in effect, prepares the gate 4 to select information of a given line.

The bit selection circuit, which selects a predetermined minor fraction of a horizontal line, comprises a gate generator 7, which is preferably a monostable multivibrator. The width of the pulse produced by the generator 7 corresponds to the minor fraction, or bit, selected for transmission.

The gate generator 7 is controlled by a delay generator 8, which is preferably of the phantastron type. The phantastron is biased to produce a given delay by a step generator 9, which may be a relay-type stepping switch, or an electronic switch. The delay, of course, is less than the period of a line and the phantastron is triggered into operation by the horizontal line synchronizing pulses. The gate generator 7 responds only to the trailing edge of the delayed pulse to produce the gating pulse of given width. For any given position of the step generator 9, the delay generator 8 produces a succession of delayed pulses, of the same width, in response to the horizontal line pulses. If we assume the delay generator 8 is adjusted to produce a pulse having a trailing edge conciding with the forward boundary of a first increment of time base, for example, increment A, Fig. 2, and that counter 5 produced a pulse at the inception of line 1, then gate 4 is opened to "pass" video information occurring during the time increment A, and this bit of information is passed to a modulator 10 for transmission. Thus, a minor fraction of video information is selected from line 1, Fig. 2. It is apparent that during the remainder of the line, gate 4 is closed because of the absence of an output from the gate generator 7. Further, upon termination of line 1, the gate generator 6 will not produce another pulse until line 2 of the next frame, i.e., 526 lines later, and then line 2 of increment A will be selected. This process of selecting bits of time base A from successive lines of successive frames continues until the last bit of the vertical strip A has been selected. Immediately thereafter, before the next horizontal pulse, the step generator 9 is operated so that the phantastron produces another succession of delayed pulses each having a trailing edge at the boundary of the time increments A, B in Fig. 2. The bit selection gating pulses now select a vertical strip of information, bit-by-bit, of time base increment B, Fig. 2. This process of stepping the vertical strip across the raster is continued until all the video information is transmitted. The process is then repeated for another picture.

The step generator 9 is controlled by a counter 11, which is preferably a bistable multivibrator and is designed to deliver a pulse to the step generator 9 when it is desired to step the "vertical strip." The count, of course, is determined by the number of active horizontal lines in a frame and the resolution desired.

In the United States standard television signals, the blanking pulses for the horizontal retrace have a length of ten microseconds, and approximately 84% of the time is available for scanning in the forward direction. Similarly, the vertical blanking pulses have a length of about 1250 microseconds, which is between 7 and 8% of the total time. The number of active lines, therefore, in a picture is approximately 485.

Thus, if standard television resolution is desired, the counter 11 should be set to produce a pulse for each 485 frames. This pulse operates the step generator to apply the next incremental bias on the phantastron. After the last bias position has been selected, the step generator is returned to its original position by the next succeeding pulse from the counter.

The counter 11 is operated by a pulse from a gate 12 which is adapted to produce a pulse in response to coincident application of a frame blanking pulse from the scanner 1 and a pulse from generator 13. The gate generator 13 is triggered by an output pulse from the counter 5, which occurs once every 526 lines. Since the blanking pulse is a relatively long pulse, it overlaps the pulse from the counter 5, which occurs one line later in time.

The modulator 10 may be a conventional facsimile modulator. The video signal is superimposed on the radio frequency carrier together with the frame blanking signal from the gate 12 and the 60 cycle timing signal from the generator 14.

At the receiver (Fig. 3), the video bits are received and synthesized on a storage tube.

The 60 cycle timing signal is separated by a filter 15 and applied to a synchronizing pulse generator 16 for synchronizing the scanning at the receiver with the scanning at the transmitter. The synchronizing function is suggested by the leads marked "H Sync," and V Sync" and "Blanking" extending from the generator 16 to the storage tube 17.

The video signal is applied to a band pass filter 18 and demodulated at 19. At the output of the demodulator 19, the frame blanking pulses are separated from the video signal at 20 and the video signal is applied to a gate 21.

The video gate 21 performs a function similar to the video gate 4, in that it "passes" only the selected bits of video information.

The circuitry for opening the gate at the proper line is generally similar to the line selection circuitry utilized at the transmitting end, in that it comprises a counter or frequency divider 22 for counting 526 horizontal pulses and upon receiving that number, delivers a pulse to the video gate 21. However, in order that the count 526 starts from the proper line, i.e., the line following the line carrying the video bit, an inhibit gate 23 is provided. The inhibit gate 23 is coupled to the horizontal synchronizing pulse output of the synchronizing generator 16, and supplies corresponding pulses to the counter 22, except when inhibited by a pulse from the blanking separator 20. The frame blanking pulse is transmitted with the video signal, which is transmitted at the rate of one bit per 526 lines. The blanking pulse closes the gate 23 for a period of one line. The counter 22, therefore, starts its count on the next succeeding line and delivers a pulse in correspondence with that line one frame later. The pulse produced by the counter 22 is applied to a gate generator 24 which generates a pulse of a duration slightly longer than the period of one line.

The bit selection circuitry at the receiver is structurally and functionally similar to the corresponding circuitry at the transmitter, comprising a counter 25, step generator 26, delay generator 27 and gate generator 28.

The output from the video gate 21, therefore, is a video bit occupying the same position, i.e., time base and line, in the storage tube raster as it occupied in the raster at the transmitter. The signal is applied to the storage tube 17 and modulates the writing beam accordingly. Thus, bit-by-bit the information is synthesized on the storage tube until the complete picture is recorded on the face of the tube. This picture may then be read-out at high speed in accordance with standard techniques, or alternatively it may be read-out at a slower speed consistent with the requirements of subsequent processing operations.

While the foregoing description sets forth the principles of the invention in connection with specific apparatus, it is to be clearly understood that this description is made only by way of example and not as a limitation of the scope of the invention as set forth in the objects thereof and in the accompanying claims.

I claim:

1. A video transmission system, comprising means for repeatedly scanning an information record to produce a succession of repeated waves each corresponding to a line of information, each complete scanning of the record constituting a frame, a first pulse generator synchronized with said scanning means for producing periodic pulses, each substantially equal to the time duration of a scanning line and successive pulses separated by a period greater than that between corresponding points of two successive frames, a delay generator for producing a pulse of predetermined time base, a second pulse generator responsive to the trailing edge of the delayed pulse for producing a pulse of width corresponding to a minor fraction of the scanning line, a gating circuit coupled to the output of said first and second pulse generators and to the output of said scanning means, said gating circuit being opened to said waves by the coincident application of the pulses from said pulse generators, whereby corresponding minor fractions of successive waves are selected, and means for transmitting said selected minor fractions in succession.

2. The system according to claim 1, wherein the period between said periodic pulses is approximately equal to the period between the time the scanning moves from a point on one line of one frame to a corresponding point on the next line of the next frame.

3. The system according to claim 1, and further comprising means operative in response to a predetermined number of frames for incrementally varying the delay produced by said delay generator, whereby a delayed pulse of a different time base is generated and minor fractions of successive waves having a different time base are selected.

4. The system according to claim 3, wherein said delay generator comprises a phantastron, and said means for varying the delay of said phantastron comprises a stepping switch having a plurality of delay positions for applying different biasing potentials to said phantastron.

5. The system according to claim 4, wherein said scanning means is capable of producing frame blanking pulses, and said means for varying the delay further comprises a pulse counter coupled to said scanning means, said counter being reset to produce a pulse in response to a given number of blanking pulses, said given number being equal to the number of scanning lines in a frame bearing video information, and means for applying said counter pulse to said stepping switch for stepping said switch to the next delay position.

6. The system according to claim 1, wherein said first pulse generator comprises a pulse frequency divider coupled to said synchronizing pulse source for producing an output pulse in response to a given number of synchronizing pulses, which number is in excess of the number of synchronizing pulses required for one scanning frame.

7. The system according to claim 6, wherein said given number corresponds to one more than the number of horizontal synchronizing pulses required for one scanning frame.

8. A narrow band width video transmission system, comprising means for repeatedly scanning an information record in sequential lines and producing a succession of video waves each modulated in accordance with the information scanned, each complete scanning of the record constituting a separate frame, means for selecting corresponding minor fractions of a plurality of successive scanning lines, the plurality of minor fractions in a frame defining a vertical strip, means for transmitting only the minor fractions of the successive lines at the rate of one line per plurality of lines until all of the selected minor fractions in a vertical strip are transmitted, means for effectively stepping said vertical strip across said information record by selecting successive minor fractions of different time bases, said means for selecting minor fractions of modulated scanning lines comprising a coincident gating circuit coupled to the output of said scanning means, a synchronizing pulse generator for producing horizontal and vertical synchronizing pulses for said scanning means, a counter coupled to the output of said synchronizing means for counting horizontal synchronizing pulses and for producing a pulse in response to a given count corresponding to a plurality of lines, a pulse generator coupled to the output of said counter and adapted to generate a pulse having a duration approximately equal to the time duration of a scanning line, means for applying said pulse to one input of said coincident gating circuit, and means for generating and applying a pulse of a width equal to said minor fraction to the other input of said coincident gating circuit, whereby said gating circuit is opened to pass a given minor fraction of a given line.

9. A narrow band width video transmission system, comprising means for repeatedly scanning an information record in sequential lines and producing a succession of video waves each modulated in accordance with the information scanned, each complete scanning of the record constituting a separate frame, means for selecting corresponding minor fractions of a plurality of successive scanning lines, the plurality of minor fractions in a frame defining a vertical strip, means for transmitting only the minor fractions of the successive lines at the rate of one line per plurality of lines until all of the selected minor fractions in a vertical strip are transmitted, means for effectively stepping said vertical strip across said information record by selecting successive minor fractions of different time bases, said scanning means producing frame blanking pulses, and said means for generating a pulse equal to said minor fraction comprising a delay generator capable of producing pulses of selectively variable width, a stepping switch coupled to said delay generator for controlling the width of pulses produced thereby, a counter coupled to said stepping switch coupled to the output of said scanning means and responsive to said frame blanking pulses, said counter being preset to deliver a pulse to said stepping switch in response to a predetermined count equal to the number of minor fractions in the vertical strip, and a gate generator coupled to the output of said delay generator and adapted to be triggered by the trailing edge of the delayed pulse, the gate generator producing a pulse of given width equal to said minor fraction, whereby when all of the minor fractions in a vertical strip are transmitted the counter is adapted to actuate said stepping switch which steps said delay generator to produce a delayed pulse, the trailing edge of which triggers said gate generator into operation, whereby minor fractions of a different time base are selected defining another vertical strip.

10. A narrow band width video transmission system, comprising means for repeatedly scanning an information record in sequential lines and producing a succession of video waves each modulated in accordance with the information scanned, each complete scanning of the record constituting a separate frame, means for selecting corresponding minor fractions of a plurality of successive scanning lines, the plurality of minor fractions in a frame defining a vertical strip, means for transmitting only the minor fractions of the successive lines at the rate of one line per plurality of lines until all of the selected minor fractions in a vertical strip are transmitted, means for effectively stepping said vertical strip across said information record by selecting successive minor fractions of different time bases, said means for selecting minor fractions of modulated scanning lines comprising a coincident gating circuit coupled to the output of said scanning means, a synchronizing pulse generator for producing horizontal and vertical synchronizing pulses for said scanning means, a counter coupled to the output of said synchronizing means for counting horizontal synchronizing pulses and for producing a pulse in response to a given count corresponding to a plurality of lines, a pulse generator coupled to the output of said counter and adapted to generate a pulse having a duration approximately equal to the time duration of a scanning line, means for applying said pulse to one input of said coincident gating circuit, and means for generating and applying a pulse of a width equal to said minor fraction to the other input of said coincident gating circuit, whereby said gating circuit is opened to pass a given minor fraction of a given line, wherein said given count comprises one more than the total number of lines in a frame.

References Cited in the file of this patent

UNITED STATES PATENTS

| | | |
|---|---|---|
| 2,250,476 | Evans | July 29, 1941 |
| 2,479,880 | Toulon | Aug. 23, 1949 |